United States Patent
Suzuki et al.

(10) Patent No.: US 6,448,308 B1
(45) Date of Patent: *Sep. 10, 2002

(54) FIRE-RETARDANT RESIN COMPOSITIONS

(75) Inventors: Mioko Suzuki; Katsuhiko Hironaka; Jun Haruhara, all of Chiba (JP)

(73) Assignee: Teijin Limited, Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,490

(22) PCT Filed: Feb. 23, 1999

(86) PCT No.: PCT/JP99/00790

§ 371 (c)(1),
(2), (4) Date: Oct. 22, 1999

(87) PCT Pub. No.: WO99/42522

PCT Pub. Date: Aug. 26, 1999

(30) Foreign Application Priority Data

Feb. 23, 1998 (JP) .......................................... 10-040286
Oct. 6, 1998 (JP) .......................................... 10-284008

(51) Int. Cl.$^7$ ................................................ C08K 9/00
(52) U.S. Cl. .................... 523/205; 524/80; 524/420; 524/430; 525/439; 523/351
(58) Field of Search ................... 524/80, 430, 420, 524/497; 525/439; 523/351, 205

(56) References Cited

U.S. PATENT DOCUMENTS

| | | | |
|---|---|---|---|
| 3,847,861 A | * 11/1974 | Largman et al. | |
| 4,471,080 A | * 9/1984 | Rinaldi et al. | 524/80 |
| 4,493,913 A | 1/1985 | Hirobe et al. | 523/205 |
| 4,515,925 A | * 5/1985 | Kleiner et al. | 525/439 |
| 4,833,203 A | * 5/1989 | Endo et al. | 525/439 |
| 4,874,647 A | * 10/1989 | Yatsu et al. | 525/439 |
| 4,879,067 A | 11/1989 | Sakon et al. | 252/609 |
| 5,026,757 A | 6/1991 | Sakon et al. | 524/414 |
| 5,041,490 A | 8/1991 | Sakon et al. | 524/414 |
| 5,543,444 A | * 8/1996 | Kobayashi et al. | 524/80 |

FOREIGN PATENT DOCUMENTS

| | | |
|---|---|---|
| DE | 1496019 | 12/1977 |
| EP | 0 249 723 A2 * | 12/1987 |
| EP | 0574054 | 12/1993 |
| EP | 0893475 A1 | 1/1999 |
| EP | 0 893 475 A1 * | 1/1999 |
| GB | 1496019 | 12/1977 |
| JP | 48-85642 | 11/1973 |
| JP | 48085642 | 11/1973 |
| JP | 50-136341 | 10/1975 |
| JP | 63-346 | 1/1988 |
| JP | 63-110254 | 5/1988 |
| JP | 1-104687 | 4/1989 |
| JP | 90037370 | 8/1990 |
| JP | 9-59502 | 3/1997 |
| JP | 9059502 | 3/1997 |
| JP | 10-114856 | 5/1998 |
| JP | 10114856 | 5/1998 |
| JP | 10168297 | 6/1998 |
| JP | 10-168297 | 6/1998 |
| WO | WO 97/38051 A1 * | 10/1997 |

OTHER PUBLICATIONS

Chemical Abstracts, JP 11–012454, dated Jan. 19, 1999.*
English language Abstract of JPA 9–059502, published Apr. 3, 1997.

* cited by examiner

*Primary Examiner*—Peter Szekely
(74) *Attorney, Agent, or Firm*—Sughrue Mion, PLLC

(57) ABSTRACT

To provide a resin composition as a non-halogenated flame retardant resin composition, having a high degree of flame retardant property, equipped with good electric characteristics by suppressing the generation of phosphoric acid, and improved in working environment and safety by using a flame retardant resin composition comprising (A) a thermoplastic aromatic polyester of 100 parts weight, (B) a coated red phosphorus powder consisting of an essentially spherical red phosphorus having a cured resin coating, directly obtained from a conversion treatment method of yellow phosphorus, not requiring a pulverization and without having crushed surfaces of 1 to 15 parts weight and (C) an aromatic polycarbonate of 5 to 150 parts weight.

11 Claims, No Drawings

FIRE-RETARDANT RESIN COMPOSITIONS

TECHNICAL FIELD

The present invention relates to a flame retardant resin composition having a high degree of flame retardant property. More particularly the present invention relates to a non-halogenated flame retardant resin composition improved in working environment and safety, reducing the generation of phosphoric acid and excellent in electric characteristics.

BACKGROUND ART

The polyester such as a polybutylene terephthalate, etc., has excellent mechanical characteristics, heat resistance, chemical resistance, etc., and is widely used as molded articles for uses in an electric/electronic field, automobile field, etc.

For the molded articles used in these fields, the flame retardant properties are required in many cases. Nowadays, resin compositions using mainly a halogenated compound and an antimony compound as a flame retardant and a flame retardant assistant for imparting the flame retardant property thereto, are generally used.

However, since in the case of using a resin composition containing a halogenated flame retardant as a molded article constituting an electric appliance, sometimes a decomposition product thereof may corrode a metal part which is another element constituting the electric appliance, a non-halogenated flame retardant resin composition has been required. Also, since some halogenated flame retardants cause issues in environmental effects, the non-halogenated flame retardant resin composition is further required.

As the non-halogenated flame retardant, there are phosphorus compounds. As a representative organic phosphorus compound, a low molecular weight phosphate such as triphenylphosphate (TPP), has been frequently used so far. However, since the polyester such as the polybutylene terephthalate, requires a relatively high processing temperature, there were problems of a bleeding and insufficient heat resistance in the case of blending the low molecular weight phosphate.

In the Japanese unexamined patent publication 7-126498 (Unexamined publication on May 16, 1995, Applied on Nov. 8, 1993 as the Japanese patent application 5-278015), a non-halogenated flame retardant for the polyester resin obtained by melting for reacting a polyester-based resin, an epoxy compound having 2 or more epoxy groups in its molecule, a phenolic resin and/or one or more kinds of non-halogenated flame retardant compounds selected from phosphorus-, nitrogen- and boron-based compounds having a functional group capable of reacting with the epoxy group, was disclosed. And in the Japanese unexamined patent publication 7-278267 (Unexamined publication on Oct. 24, 1995, Applied on Apr. 7, 1994 as the Japanese patent application 6-69728), a flame retardant polyester-based resin composition obtained by blending 5 to 50 parts weight above non-halogenated flame retardant with 100 parts weight of a polyester, was disclosed. The above non-halogenated flame retardant is characterized in using an epoxy compound having 2 or more epoxy groups in molecule thereof.

In the Japanese unexamined patent publication 8-188717 (Unexamined publication on Jul. 23, 1996, Applied on Jan. 6, 1995 as the Japanese patent application 7-785), a flame retardant resin composition consisting of a thermoplastic resin such as a polystyrene and a polyester, a phosphorus compound such as a phosphate and a phosphite, and a phenolaralkyl resin such as a reaction product of a phenolic resin (for example; cresol) with an aralkylhalide (for example; α,α-dichloro-p-xylene), was disclosed.

In the Japanese unexamined patent publication 8-208884 (Unexamined publication on Aug. 13, 1996, Applied on Jan. 30, 1995 as the Japanese patent application 7-12825), a flame retardant resin composition consisting of a thermoplastic resin such as a polystyrene and a polyester, a phosphorus compound such as a phosphate and a phosphite, and a phenolic resin prepared from a phenol substituted at the ortho- or para-position, was disclosed.

While, red phosphorus among the phosphorus compounds, is known to exhibit an excellent flame retardant property even by adding a small amount. As the flame retardants using the red phosphorus, the following examples can be cited.

In the Journal of Flame Retardant Chemistry, volume 7, 69–76, 1980, it was disclosed that a polystyrene is made of flame retardant by red phosphorus and a phenolic resin.

In the Plastic Engineering, Nov., 29–31, 1993, it was disclosed that a polybutylene terephtahlate is made of flame retardant by red phosphorus and a phenolic resin.

In the Japanese patent publication 2-37370 (Unexamined patent publication 58-108248 on Jul. 28, 1983, Applied on Dec. 19, 1981 as the Japanese patent application 56-205812), a flame retardant polyester resin composition composed of a thermoplastic polyester having a softening point of 150° C. or higher such as a polyethylene terephthalate of 99 to 34 parts weight, red phosphorus coated with a thermosetting resin of 1 to 25 parts weight and a reinforcing filler of 10 to 55 parts weight, was disclosed.

A technology of adding a metal oxide for the purpose of inactivating red phosphorus, was disclosed in the Japanese unexamined patent publication 51-42746 (Unexamined publication on Apr. 12, 1976, Applied on Oct. 9, 1974 as the Japanese patent application 49-115670), the Japanese unexamined patent publication 51-150553 (Unexamined publication on Dec. 24, 1976, Applied on Jul. 9, 1976 as the Japanese patent application 51-67544), etc.

DISCLOSURE OF THE INVENTION

The object of the present invention is to provide a non-halogenated flame retardant resin composition having a high flame retardant property, improved in working environment and safety, also reducing the generation of phosphoric acid which affects electric characteristics thereof and excellent in electric characteristics.

Another object of the present invention is to provide a resin composition for electric/electronic parts consisting of a non-halogenated resin composition having a high flame retardant property and excellent in electric characteristics, and also electric/electronic parts composed thereof.

Further objectives and advantages of the present invention will be clarified by the following explanation.

The present invention comprises the following constitution.

1. A flame retardant resin composition comprising (A) a thermoplastic aromatic polyester of 100 parts weight, (B) a coated red phosphorus powder composed of essentially spherical red phosphorus, having a cured resin coating, directly obtained by a conversion treatment method of yellow phosphorus, not requiring the pulverization and without having crushed surfaces of 1 to 15 parts weight and (C) an aromatic polycarbonate of 5 to 150 parts weight.

2. A flame retardant resin composition according to paragraph 1, wherein (D) at least one kind of a compound selected from a group consisting of titanium oxide, aluminum oxide and molybdenum sulfide is further contained in a range of 0.05 to 5 parts weight based on 100 parts weight of (A) the thermoplastic aromatic polyester.
3. A flame retardant resin composition according to paragraph 2, wherein a generated amount of phosphine after heating the composition at a temperature of 120° C. for 24 hours is not more than $5\times10^{-5}$ g based on 1 g of red phosphorus contained in the composition, and also the generated amount of phosphoric acid by maintaining the composition under a humid and heat condition at a temperature of 121° C., at a humidity of 100% RH and under a pressure of 2.1 atm., is not more than $3\times10^{-4}$ g based on 1 g of the red phosphorus contained in the composition.
4. A flame retardant resin composition according to paragraph 1, wherein an inorganic filler is further contained in a range of 5 to 150 parts weight based on 100 parts weight of (A) the thermoplastic aromatic polyester.
5. A flame retardant resin composition according to paragraph 1, wherein a fluorine resin is further contained in a range of 0.01 to 10 parts weight based on 100 parts weight of (A) the thermoplastic aromatic polyester.
6. A flame retardant resin composition according to paragraph 1, wherein (B) the coated red phosphorus powder and (C) the aromatic polycarbonate are melted and kneaded beforehand.

The present invention is explained in detail as follows.

<<Thermoplastic Aromatic Polyester>>

The thermoplastic aromatic polyester (A) is a polyester consisting of an aromatic dicarboxylic acid as a main dicarboxylic acid component and an aliphatic diol having a carbon number of 2 to 10 as a main diol component. It contains preferably 80 mole % or more, more preferably 90 mole % or more of the aromatic dicarboxylic acid component based on the total dicarboxylic acid components, and also contains preferably 80 mole % or more, more preferably 90 mole % or more of the aliphatic diol component having the carbon number of 2 to 10 based on the total diol components.

As the aromatic dicarboxylic acid, for example, terephthalic acid, isophthalic acid, phthalic acid, methyl terephthalate, methyl isophthalate, and 2,6-naphthalene dicarboxylic acid can be cited. They can be used either by one kind, or by two or more kinds simultaneously.

As the dicarboxylic acid component which can be used as a copolymerization component with the aromatic dicarboxylic acid, for example, an aliphatic or an alicyclic dicarboxylic acid such as adipic acid, sebacic acid, decane dicarboxylic acid, azelaic acid, dodecane dicarboxylic acid, cyclohexane dicarboxylic acid, etc., can be cited.

As the aliphatic diol having the carbon number of 2 to 10, for example an aliphatic diol such as ethylene glycol, trimethylene glycol, tetramethylene glycol, hexamethylene glycol, neopentyl glycol, etc., and an alicyclic diol such as 1,4-cyclohexane dimethanol, etc., can be cited. These aliphatic diols and alicyclic diols can be used either by one kind or by two or more kinds simultaneously. As the diol component which can be used as the copolymerization component with the aliphatic diols having the carbon number of 2 to 10, for example, p,p'-dihydroxyethoxybisphenol A and a polyoxyethylene glycol can be cited.

Among them, as the thermoplastic aromatic polyester (A), the thermoplastic aromatic polyester composed of an ester unit in which the main dicarboxylic acid component is at least one dicarboxylic acid selected from group consisting of terephthalic acid and 2,6-naphthalene dicarboxylic acid, and the main diol component is at least one kind of diol selected from a group of ethylene glycol, trimethylene glycol and tetramethylene glycol, is preferable.

Especially, a polyester composed of a main recurring unit consisting of ethylene terephthalate, trimethylene terephthalate, tetramethylene terephthalate or tetramethylene-2,6-naphthalene dicarboxylate, is preferable. Also, a polyester elastomer consisting of these recurring unit as a main recurring unit of a hard segment thereof, can be used.

As the above polyester elastomer, an elastomer having tetramethylene terephthalate or tetramethylene-2,6-naphthalene dicarboxylate as a main recurring unit of its hard segment, is preferable. The polyester elastomer is constituted by a soft segment and the above hard segment, and as the soft segment, for example, a polyester elastomer composed of a dicarboxylic acid component consisting of one or more kinds selected from a group consisting of terephthalic acid, isophthalic acid, sebacic acid and adipic acid, and a diol component composed of one or more kinds selected from a group consisting of a long chain diol having carbon number of 5 to 10 and $H(OCH_2CH_2)_iOH$ (i=2–5), and also having a melting point of 100° C. or lower, or being amorphous, or a polycaprolactone can be used.

Further, the main component means a component occupying 80 mole % or more, preferably 90 mole % or more of the total dicarboxylic acid components or the total diol components, and the main recurring unit means a recurring unit occupying 80 mole % or more, preferably 90 mole % or more of the total recurring units.

The thermoplastic aromatic polyester (A) has an intrinsic viscosity measured at 35° C. in ortho-chlorophenol, of preferably 0.5 to 1.4 dl/g, more preferably 0.6 to 1.2 dl/g. The intrinsic viscosity of less than 0.5 is not preferable since the mechanical strength of the obtained composition is reduced, and the viscosity exceeding 1.4, is also not preferable, since the flowing property, etc., of the obtained composition are reduced.

<<Coated Red Phosphorus Powder>>

In the present invention, a coated red phosphorus powder (B), consisting essentially of a spherical red phosphorus having a cured resin coating, not requiring a pulverization, directly obtained from a yellow phosphorus conversion treatment method and without having crushed surfaces, is used.

If red phosphorus without having the coating is used, there is a risk of an ignition and a generation of phosphine caused by a high temperature, a mechanical shock, etc.

The coated red phosphorus powder (B) is essentially a spherical-shaped red phosphorus without having crushed surfaces, and obtained by the conversion treating method of yellow phosphorus. By using such essentially spherical red phosphorus, the surfaces thereof are extremely stabilized, the stability of the red phosphorus is increased and the stability of the composition is improved. On the other hand, in the case of using a red phosphorus other than the above essentially spherical red phosphorus, i.e., a red phosphorus obtained as a lump-shaped material by heat-treating yellow phosphorus in a reaction vessel, so-called a conversion pot, for several days and then crushing in a crushing process, there are following problems. That is, since many active points are formed on the surface of the red phosphorus by the crushing, the red phosphorus is liable to react with oxygen or a water molecule and becomes a cause of the ignition and the generation of phosphine and oxide.

As the method for producing the essentially spherical red phosphorus of the coated red phosphorus powder (B), the following method is cited. That is, yellow phosphorus is heated at a temperature in the vicinity of the boiling point thereof in a hermetically closed vessel substituted with an inert gas to initiate a conversion reaction to red phosphorus. And then, the reaction is stopped when the conversion rate or the particle diameter attains a desired level, and the unconverted yellow phosphorus is distilled off By this method, an amorphous red phosphorus composed of fine essentially spherical-shaped particles or associates thereof, totally not requiring a pulverization, is obtained. The conversion rate and the particle diameter of the red phosphorus can be adjusted by a reaction time and a reaction temperature. The preferable reaction temperature is 250 to 350° C. and the preferable conversion rate is 60% or less.

The cured resin coating on the coated red phosphorus powder (B) consists preferably of at least one kind of the cured resin selected from a group of a phenolic resin, an epoxy resin, an unsaturated polyester resin, a melamine resin, a urea resin and an aniline resin.

The coated red phosphorus powder (B) is preferably further contains by dispersing at least one kind of inorganic compound selected from a group consisting of aluminum hydroxide, magnesium hydroxide, zinc hydroxide and titanium hydroxide in the cured resin coating.

These inorganic compounds can be further contained under the above cured resin coating by making a contact with the red phosphorus. That is, under the cured resin coating of the coated red phosphorus powder (B), a coating consisting of at least one kind of the inorganic compound selected from a group consisting of aluminum hydroxide, magnesium hydroxide, zinc hydroxide and titanium hydroxide, and making a contact with the red phosphorus, is allowed to be present.

The mean particle diameter of the coated red phosphorus powder (B), is preferably in a range of 5 to 40 g m, more preferably in the, range of 25 to 35 $\mu$m. If the mean particle diameter is less than 5 $\mu$m, it is not preferable in a view of a dispersion uniformity, and if it exceeds 40 $\mu$m, it is also not preferable since the mechanical characteristics and flame retardant property are reduced.

The coated red phosphorus powder (B) is blended so as to become in a range of 1 to 15 parts weight based on the thermoplastic aromatic polyester (A). If the blended amount is less than 1 part weight, the flame retardant property becomes insufficient, and if it exceeds 15 parts weight, the mechanical characteristics of the molded articles obtained from the flame retardant resin composition is reduced.

The coated red phosphorus powder (B) is preferably used as master pellets prepared previously by melting and kneading with the aromatic polycarbonate (C). As the aromatic polycarbonate (C), an aromatic polycarbonate having a viscosity-averaged molecular weight of 20,000 to 25,000, is preferable. If the viscosity-averaged molecular weight is less than 20,000, the flame retardant property is reduced, and if it exceeds 25,000, it is not preferable since the flowing property is reduced to reduce its molding property.

It is possible to obtain a resin composition capable of obtaining a molded article excellent in mechanical property by using the coated red phosphorus powder (B) as master pellets prepared in advance by melting and kneading with the aromatic polycarbonate (C) in making the molded articles. Since the safety is improved, it is desirable to use the above red phosphorus as the master pellets.

By blending the master pellets prepared by mixing and kneading the coated red phosphorus powder (B) with the aromatic polycarbonate (C) in advance, with the thermoplastic aromatic polyester (A), the flame retardant property of the composition is markedly improved in comparison with the case of preparing master pellets of the coated red phosphorus powder (B) with a thermoplastic resin other than the aromatic polycarbonate and blending the obtained master pellets with the thermoplastic aromatic polyester (A) together with the aromatic polycarbonate.

The content of the coated red phosphorus powder (B) in the master pellets, is preferably 10 to 15 weight % based on the total weight of the master pellets. If the content is less than 10 weight %, it is not preferable since the amount of the master pellets to be added, is increased since the efficiency of the flame retardant is relatively reduced, and if the content exceeds 15 weight %, it is also not preferable since it is difficult to prepare the master pellets and also the safety is reduced.

<<Aromatic Polycarbonate>>

The aromatic polycarbonate (C) is usually obtained by reacting a divalent phenol with a carbonate precursor by a solution method or a melting method.

As the divalent phenol, for example, 2,2-bis(4-hydroxyphenyl)propane (hereinafter may be abbreviated as bisphenol A), 1,1-bis(4-hydroxyphenyl)ethane, 2,2-bis(4-hydroxy-3-methylphenyl)propane, bis(4-hydroxyphenyl)sulfone, etc., are cited. A bis(4-hydroxyphenyl)alkane is preferable, and among them bisphenol A is especially preferable. The divalent phenol can be either used singly or by mixing 2 or more kinds of them.

As the carbonate precursor, for example, a carbonyl halide, a carbonate or a haloformate can be cited. As a representative example, phosgene, diphenyl carbonate, a dihaloformate of a divalent phenol and their mixtures are cited. In the production of the aromatic polycarbonate, a suitable molecular weight adjusting agent, branching agent, catalyst, etc., can be used.

The aromatic polycarbonate (C) having 20,000 to 25,000 molecular weight expressed by a viscosity-averaged molecular weight, is preferable. If the molecular weight is less than 20,000, the mechanical strength is reduced and also the flame retardant property is reduced, and if it exceeds 25,000, then the flowing property, etc., are reduced.

The aromatic polycarbonate (C) is blended so as to be in a range of 5 to 150 parts weight, based on the thermoplastic aromatic polyester (A) of 100 parts weight. If the amount is less than 5 parts weight, the flame retardant property is insufficient and if it exceeds 150 parts weight, the mechanical characteristics of the obtained molded article are reduced.

<<Titanium Oxide, Aluminum Oxide and Molybdenum Sulfide>>

It is preferable for the flame retardant resin composition in the present invention to contain at least one kind of compound (D) selected from a group consisting of titanium oxide, aluminum oxide and molybdenum sulfide. By blending the above component (hereinafter may be called as the (D) component), the essentially spherical red phosphorus in the composition is markedly stabilized and the amount of phosphine generation can be widely reduced.

Such effect as the stabilization of the essentially spherical red phosphorus and the reduction of the phosphine generation can be achieved by adding the titanium oxide, aluminum oxide, molybdenum sulfide or copper oxide, but in the case of blending copper oxide, it is not preferable since copper oxide reacts with the essentially spherical red phosphorus to form phosphoric acid to damage the electric characteristic thereof.

The adding amount of the above mentioned (D) component is preferably 0.05 to 5 parts weight based on the thermoplastic aromatic polyester (A) of 100 parts weight. If the amount is less than 0.05 parts weight, it is not preferable since the stabilizing effect for red phosphorus is small and if it exceeds 5 parts weight, it is also not preferable since the mechanical characteristics of the molded article obtained from the resin composition are reduced.

By blending the above (D) component with the thermoplastic aromatic polyester (A), the coated red phosphorus powder (B) and the aromatic polycarbonate (C) in the above amount, it is possible to obtain a flame retardant resin composition exhibiting the phosphine generating amount after heating at 120° C. for 24 hour of $5 \times 10^{-5}$ g or less based on 1 g of red phosphorus contained in the flame retardant resin composition, and the phosphoric acid generating amount under a humid heat condition at 121° C. temperature, at 100% RH and under 2.1 atm. of $3 \times 10^{-4}$ or less based on 1 g of red phosphorus contained in the flame retardant resin composition. In this case, since the stability of the essentially spherical red phosphorus is increased, and also the increase of the phosphoric acid production does not occur, bad effects to electric characteristics are extremely small and a resin composition equipped with good electric characteristics can be obtained.

<<Additive>>

It is possible for the flame retardant resin composition in the present invention to further contain an inorganic filler in a range, not harming the object of the present invention.

As the inorganic filler, for example, a particle state or an amorphous inorganic filler such as calcium carbonate, titanium oxide, a feldspar-based mineral, a clay, a white carbon, a carbon black, glass beads, a silica, etc., a scaly inorganic filler such as a kaolin clay and a talc, and a fibrous inorganic filler such as a glass fiber, a wollastonite, potassium titanate, aluminum borate, a carbon fiber, an aramid fiber, etc., can be cited. When the inorganic filler is contained, it is preferable to contain the same in a range of 5 to 150 parts weight based on the thermoplastic aromatic polyester (A) of 100 parts weight.

The flame retardant resin composition in the present invention can also contain a flame retardant property-modifying agent. As the flame retardant property-modifying agent, a fluorine resin is preferable, and as the fluorine resin, a polytetrafluoroethylene is cited as an example. In the case of containing the fluorine resin, it is preferable to contain 0.01 to 10 parts weight of the same based on the thermoplastic aromatic polyester (A) of 100 parts weight.

The flame retardant resin composition in the present invention can contain an additive such as an antioxidant, a heat stabilizing agent, an ultraviolet rays-absorbing agent, a lubricant, a nucleating agent, a releasing agent, a pigment, an impact resistance-improving agent such as various elastomers, etc.

The fire retarding resin composition in the present invention can also contain the oxide or hydroxide of zinc, aluminum, magnesium and titanium as a stabilizer of red phosphorus.

<<Production Method>>

The flame retardant resin composition in the present invention can be produced by a method of melting and kneading master pellets of the coated red phosphorus powder (B) with the aromatic polycarbonate (C), the thermoplastic aromatic polyester (A), and the inorganic filler and the other additive as necessary simultaneously by using, for example, an extruder.

The coated red phosphorus powder (B) and the aromatic polycarbonate (C) are preferably melted and kneaded in advance. By using thus obtained master pellets of the coated red phosphorus powder (B) with the aromatic polycarbonate (C), it is possible to obtain the flame retardant resin composition, wherein the generated amount of phosphine after heating at 120° C. for 24 hours is $5 \times 10^{-5}$ g or less based on 1 g of red phosphorus contained in the composition, and the produced amount of phosphoric acid under a humid heat condition at 121° C., at 100% RH and under 2.1 atm is, $3 \times 10^{-4}$ g or less based on 1 g of red phosphorus contained in the composition.

The inorganic filler and the other additives may be melted and kneaded in advance with the thermoplastic polyester (A) or the aromatic polycarbonate (C).

The resin composition obtained by melting and kneading in the extruder, is usually cut as a pellet shape by a pelletizer, and then can be molded to obtain a molded article.

As the method for molding, an injection molding and a blow molding can be exemplified.

The flame retardant composition in the present invention is suitable as the flame retardant resin composition for electric/electronic parts, and suitably used as molded parts used in the electric/electronic uses such as a home electric appliance, an OA instrument, etc., by molding as the electric/electronic parts.

Also, the flame retardant resin composition in the present invention can be used in automobile uses. More concretely, for example, it can be used as a switch part, a motor part, an ignition coil case, a coil bobbin, a connector, a relay case and a fuse case.

EXAMPLES

The present invention is explained further in detail by following examples.

Evaluation of Characteristics

The evaluations of the characteristics of the composition were performed by the following evaluation methods.

(1) Intrinsic Viscosity

The viscosity was measured at 35° C. by using ortho-chlorophenol as a solvent.

(2) Flame Retardant Property

According to the vertical burning test of the UL94 standard, the flame retardant property was evaluated by using an test piece having a thickness of 0.8 mm. The flame retardant properties were classified in 4 kinds as V-0, V-1, V-2 and HB in accordance with the evaluation method described in the UL94.

(3) The Amount of Phosphine Generation

By putting the pellets of 10 g prepared by the above method in a glass bottle with a lid, a heat-treatment was conducted at 120° C. for 24 hours in a state of closing the lid. After cooling with air at a room temperature for 5 hours, the concentration of phosphine in the glass bottle was measured, and the generated amount of phosphine based on 1 g of red phosphorus contained in the pellets was calculated by dividing the obtained value with the amount of red phosphorus contained in the pellet. Further, the phosphine concentration was measured by using a gas detector tube for phosphine made by Gastech Co., Ltd.

(4) The Amount of Phosphoric Acid Generation

A flat plate having a size of 25 mm×25 mm×1 mm thickness was molded by using an injection molding machine (made by FANUK, Ltd.) having a locking force of 15 tons, and the molded article was subjected to a humid heat treatment under a temperature of 121° C., at 100% RH and under 2.1 atm. for 200 hours. After cooling with air at a room temperature for 24 hours, the deposited material on the surface of the molded articles was dissolved with a pure water of 5 ml, the concentrations of phosphoric acid and phosphorous acid were measured by using an ion chromatograph (type DX-100 made by DIONEX K.K.) and the generated amount of phosphoric acid based on 1 g of red phosphorus was calculated by dividing the total weight of phosphoric acid and phosphorous acid with the weight of red phosphorus contained in the molded articles.

Raw Material

The red phosphorus powder and the red phosphorus master pellets used in the examples are as follows.

(1) Coated Red Phosphorus Powder

As the coated red phosphorus powder, NOVAEXCEL 140 made by Rinkagaku Kogyo Co., Ltd. was used. The details of the coated red phosphorus were as follows.

The coated red phosphorus powder having coatings of the following ① and ②, is composed of essentially spherical red phosphorus directly obtained by a conversion treatment method of yellow phosphorus, not requiring pulverization and without having crushed surfaces, and has a mean particle diameter of 30 μm:

① A coating with a cured phenolic resin obtained by suspending the essentially spherical red phosphorus in water, adding phenol and formalin therein and heating;

② A coating composed of aluminum hydroxide, positioned under the above-mentioned coating and making a contact with the red phosphorus;

(2) Red Phosphorus Master Pellet

The red phosphorus mater pellets were prepared as follows. That is, the aromatic polycarbonate having a viscosity-averaged molecular weight as described in Table 1 and 2, with the above-mentioned coated red phosphorus powder were compounded in prescribed amounts as described in the Tables, and melted and kneaded by a single- or twin-screw extruder.

Examples 1 to 5 and Comparative Examples 1 to 9

The compositions of examples 1 to 5 are shown in Table 1 and the compositions of comparative examples 1 to 9 are shown in Table 2. The units in the composition in the Tables are expressed in part weight.

In all cases, a twin-screw extruder of TEX 44 (made by Nihon Seiko Co., Ltd. and having each screw diameter of 44 mm) was used, as the extruder. The barrel temperature was at 250° C. in the examples 1 to 4 and in the comparative examples 1 to 8, and at 280° C. in the example 5 and in the comparative example 9. The output rate was in all cases at 50 Kg/hr. The compositions described in Tables 1 and 2, were melted and kneaded at a screw rotation rate of 150 r.p.m., and then pelletized by using pelletizer. The extrusion processing of the examples were stable.

The obtained pellets were dried at 130° C. for 5 hours, and burning test pieces and flat plate test pieces were molded at 260° C. of cylinder temperature and 60° C. of mold temperature in the examples 1 to 4 and in the comparative examples 1 to 8, and also at 280 ° C. of cylinder temperature and 60° C. of mold temperature in the example 5 and in the comparative example 9.

By using these pellets and test pieces, burning tests, the amounts of phosphine generation, the amounts of phosphoric acid generation were evaluated. The results are shown in Tables 3, 4 and 5.

TABLE 1

| Composition (part weight) | Example 1 | Example 2 | Example 3 | Example 4 | Example 5 |
|---|---|---|---|---|---|
| PBT | 100 | 100 | 100 | 100 | |
| PET | 40 | 40 | | | |
| PBN | | | | | 100 |
| Glass fiber | 110 | 110 | 100 | 100 | 80 |
| Red phosphorus master pellet 1 | 65 | 65 | 85 | 85 | 45 |
| Titanium oxide | 1 | | 1 | | 1 |
| Aluminum oxide | | 1 | | 1 | | where, each of the components in Table 1 is as follows.

PBT: Polytetramethylene terephthalate, made by Teijin Limited; intrinsic viscosity, 0.88.

PET: Polyethylene terephthalate, made by Teijin Limited; intrinsic viscosity, 0.83.

PBN: Polytetramethylene naphthalene dicarboxylate, made by Teijin Limited; intrinsic viscosity, 0.76.

Glass fiber: made by Asahi glass Co., Ltd., T124.

Red phosphorus master pellet 1: A master pellet composed of the coated red phosphorus powder (made by Rinkagaku Kogyo Co., Ltd., NOVAEXCEL 1 140) of 15 weight %, and the aromatic polycarbonate (made by Teijin Chemical Co., Ltd.; Panlite L1225; viscosity-averaged molecular weight, 22,200) of 85 weight %.

Titanium oxide: made by Ishihara Sangyo Kaisha, Ltd.; CR-80.

Aluminum oxide: Kanto Chemical Co., Ltd.; specially pure grade.

TABLE 2

| Composition (part weight) | Com. Expl. 1 | Com. Expl. 2 | Com. Expl. 3 | Com. Expl. 4 | Com. Expl. 5 | Com. Expl. 6 | Com. Expl. 7 | Com. Expl. 8 | Com. Expl. 9 |
|---|---|---|---|---|---|---|---|---|---|
| PBT | 100 | 100 | 100 | 100 | 100 | 100 | 100 | 100 | |
| PET | 40 | 40 | | | | | | | |
| PBN | | | | | | | | | 100 |
| Glass fiber | 110 | 110 | 100 | 100 | 100 | 100 | 100 | 100 | 100 |
| Red phosphorus master pellet 1 | | | 85 | | 85 | 85 | 85 | 85 | 85 |
| Red phosphorus master pellet 2 | 65 | | | | | | | | |
| Red phosphorus master pellet 3 | | 65 | | | | | | | |

TABLE 2-continued

| Composition (part weight) | Com. Expl. 1 | Com. Expl. 2 | Com. Expl. 3 | Com. Expl. 4 | Com. Expl. 5 | Com. Expl. 6 | Com. Expl. 7 | Com. Expl. 8 | Com. Expl. 9 |
|---|---|---|---|---|---|---|---|---|---|
| Red phosphorus master pellet 4 | | | | 13 | | | | | |
| PC | | | | 72 | | | | | |
| Titanium oxide | | | | | 0.01 | | | | |
| Aluminum oxide | | | | | | 0.01 | | | |
| Zinc Oxide | | | | | | | 0.5 | | |
| Cupric oxide | | | | | | | | 0.5 | | where, each of the components in Table 2 is as follows.

PBT: Polytetramethylene terephthalate, made by Teijin Limited; intrinsic viscosity, 0.88.

PET: Polyethylene terephthalate, made by Teijin Limited; intrinsic viscosity, 0.83.

PBN: Polytetramethylene naphthalene dicarboxylate, made by Teijin Limited; intrinsic viscosity, 0.76.

PC: An aromatic polycarbonate, made by Teijin Chemical Co., Ltd.; Panlite L1225; viscosity-averaged molecular weight, 22,200.

Glass fiber: made by Asahi glass Co., Ltd.; T124.

Red phosphorus master pellet 1: A master pellet composed of the coated red phosphorus powder (made by Rinkagaku Kogyo Co., Ltd.; NOVAEXCEL 140) of 15 weight %, with the aromatic polycarbonate (made by Teijin Chemical Co., Ltd.; Panlite; L1225; viscosity-averaged molecular weight, 22,200) of 85 weight %.

Red phosphorus master pellet 2: A master pellet composed of a crushed red phosphorus, which is on the market, of 15 weight %, with the aromatic polycarbonate (made by Teijin Chemical Co., Ltd.; Panlite L1225; viscosity-averaged molecular weight, 22,200) of 85 weight %.

Red phosphorus master pellet 3: A master pellet composed of the coated red phosphorus powder (made by Rinkagaku Kogyo Co., Ltd.; NOVAEXCEL 140) of 15 weight %, with the aromatic polycarbonate (made by Teijin Chemical Co., Ltd.; Panlite; L1225L; viscosity-averaged molecular weight, 19,700) of 85 weight %.

Red phosphorus master pellet 4: A master pellet composed of the coated red phosphorus powder (made by Rinkagaku Kogyo Co., Ltd.; NOVAEXCEL 140) of 30 weight %, with the polytetramethylene terephthalate [made by Teijin Limited; intrinsic viscosity, 0.87 (dl/g)] of 70 weight % (provided that the amount of the tetramethylene terephthalate in this master pellet is included in 100 parts weight in PBT column, therefore the amount shown in the red phosphorus master pellet column is the amount of only the coated red phosphorus powder).

Titanium oxide: made by Ishihara Sangyo Kaisha; CR-80.

Aluminum oxide: Kanto Chemical Co., Ltd.; specially pure grade.

Zinc oxide: made by Kanto Chemical Co., Ltd.; specially pure grade.

Cupric oxide: made by Kanto Chemical Co., Ltd.; first grade.

TABLE 3

| Characteristics | Example 1 | Example 2 | Example 3 | Example 4 | Example 5 |
|---|---|---|---|---|---|
| 0.8 mm UL94 burning property | V-0 | V-0 | V-0 | V-0 | V-0 |
| Generated amount of phosphine (g/g) | $3.2 \times 10^{-5}$ | $2.7 \times 10^{-5}$ | $3.1 \times 10^{-5}$ | $2.8 \times 10^{-5}$ | $3.3 \times 10^{-5}$ |
| Generated amount of phosphoric acid (g/g) | $0.8 \times 10^{-4}$ | $0.9 \times 10^{-4}$ | $0.9 \times 10^{-4}$ | $0.9 \times 10^{-4}$ | $0.9 \times 10^{-4}$ |

TABLE 4

| Characteristics | Comparative Example 1 | Comparative Example 2 | Comparative Example 3 | Comparative Example 4 |
|---|---|---|---|---|
| 0.8 mm UL94 burning property | V-0 | V-2 | V-0 | HB |
| Generated amount of phosphine (g/g) | $2.2 \times 10^{-2}$ | — | $9.5 \times 10^{-5}$ | — |
| Generated amount of phosphoric acid (g/g) | — | — | $0.9 \times 10^{-4}$ | — |

TABLE 5

| Characteristics | Comp. Example 5 | Comp. Example 6 | Comp. Example 7 | Comp. Example 8 | Comp. Example 9 |
|---|---|---|---|---|---|
| 0.8 mm UL94 burning property | V-0 | V-0 | V-0 | V-0 | V-0 |
| Generated amount of phosphine (g/g) | $9.0 \times 10^{-5}$ | $8.5 \times 10^{-5}$ | $9.7 \times 10^{-5}$ | $1.0 \times 10^{-5}$ | $9.8 \times 10^{-5}$ |
| Generated amount of phosphoric acid (g/g) | $0.8 \times 10^{-4}$ | $0.9 \times 10^{-4}$ | $1.6 \times 10^{-4}$ | $9.4 \times 10^{-2}$ | $0.9 \times 10^{-4}$ |

As clearly shown by Tables 3, 4 and 5, by forming a master pellet with the coated red phosphorus powder having a cured resin coating and consisting of the essentially spherical red phosphorus directly obtained from a conversion treatment of yellow phosphorus, not requiring the pulverization and without having crushed surfaces, and the aromatic polycarbonate resin in advance, a highly flame retardant property is obtained. Further, by using titanium oxide and aluminum oxide, it becomes possible to reduce the generation of phosphine, while inhibiting

EFFECT OF INVENTION

The flame retardant resin composition in the present invention is a non-halogenated flame retardant resin composition and can provide a resin composition having a high degree of flame retardant property, equipped with good electric characteristics by inhibitong the generation of phosphoric acid, and improved in working environment and safety. The resin composition in the present invention can be used suitably as electric/electronic parts and automobile parts on being molded as a molded article.

What is claimed is:

1. A flame retardant resin composition comprising:
   (A) a thermoplastic aromatic polyester of 100 parts weight;
   (B) a coated red phosphorus powder composed of essentially spherical red phosphorus, having a cured resin coating, directly obtained by a conversion treatment method of yellow phosphorus, not requiring the pulverization thereof and without having crushed surfaces of 1 to 15 parts weight;
   (C) 5 to 150 parts weight of an aromatic polycarbonate having a viscosity-averaged molecular weight of 20,000 to 25,000; and
   (D) at least one compound selected from the group consisting of titanium oxide, aluminum oxide, and molybdenum sulfide, in a range of 0.05 to 5 parts weight based on 100 parts weight of the thermoplastic aromatic polyester (A);
   wherein the coated red phosphorus powder (B), and aromatic polycarbonate (C) are melted and kneaded beforehand.

2. A flame retardant resin composition according to claim 1, wherein the generated amount of phosphine after heating the composition at a temperature of 120° C. for 24 hours is not more than $5 \times 10^{-5}$ g based on 1 g of red phosphorus contained in the composition, and also the generated amount of phosphoric acid by maintaining the composition under a humid heat condition at a temperature of 121° C., at a humidity of 100% RH and under a pressure of 2.1 atm. is not more than $3 \times 10^{-4}$ based on 1 g of the red phosphorus contained in the composition.

3. A flame retardant resin composition according to claim 1, wherein (A) the thermoplastic aromatic polyester is a polyester comprising ethylene terephthalate, trimethylene terephthalate, tetramethylene terephthalate, or tetramethylene-2,6-naphthalene dicarboxylate as a main recurring unit.

4. A flame retardant resin composition according to claim 1, wherein the cured resin coating of (B) the coated red phosphorus powder, consists essentially of at least one kind of the cured material of a curable resin selected from a group consisting of a phenolic resin, an epoxy resin, an unsaturated polyester resin, a melamine resin, a urea resin and an aniline resin.

5. A flame retardant resin composition according to claim 1, wherein at least one kind of an inorganic compound selected from a group consisting of aluminum hydroxide, magnesium hydroxide, zinc hydroxide and titanium hydroxide, is dispersed and contained in the cured resin coating of (B) the coated red phosphorus powder.

6. A flame retardant resin composition according to claim 4, wherein under the cured resin coating of (B) the coated red phosphorus powder, a coating consisting of at least one kind of an inorganic compound selected from a group consisting of aluminum hydroxide, magnesium hydroxide, zinc hydroxide and titanium hydroxide is further present by making a contact with the red phosphorus.

7. A flame retardant resin composition according to claim 1, wherein the mean particle diameter of (B) the coated red phosphorus powder, is in a range of 5 to 40 $\mu$m.

8. A flame retardant resin composition according to claim 1, wherein an inorganic filler is further contained in a range of 5 to 150 parts weight based on 100 parts weight of (A) the thermoplastic aromatic polyester.

9. A flame retardant resin composition according to claim 1, wherein a fluorine resin is further contained in a range of 0.01 to 10 parts weight based on 100 parts weight of (A) the thermoplastic aromatic polyester.

10. An electric/electronic part being molded from the flame retardant resin composition according to claim 1.

11. A flame retardant composition according to claim 1, wherein the thermoplastic aromatic polyester (A) has an intrinsic viscosity measured at 35° C. in ortho-chlorophenol of 0.6 to 1.2 dl/g.

* * * * *